United States Patent
Belani et al.

(10) Patent No.: US 12,323,190 B2
(45) Date of Patent: Jun. 3, 2025

(54) UNDERWATER COMMUNICATION NETWORK FOR AUTONOMOUS UNDERWATER VEHICLES

(71) Applicant: ONESUBSEA IP UK LIMITED, London (GB)

(72) Inventors: Ashok K. Belani, Houston, TX (US); Arnaud Jarrot, Clamart (FR); Arnaud Croux, Brookline, MA (US); Stephane Vannuffelen, Meudon (FR); Sepand Ossia, Arlington, MA (US)

(73) Assignee: ONESUBSEA IP UK LIMITED, London (GB)

( * ) Notice: Subject to any disclaimer, the term of this patent is extended or adjusted under 35 U.S.C. 154(b) by 245 days.

(21) Appl. No.: 18/058,465

(22) Filed: Nov. 23, 2022

(65) Prior Publication Data

US 2024/0171290 A1    May 23, 2024

(51) Int. Cl.
*H04B 13/02* (2006.01)
*E21B 41/00* (2006.01)

(52) U.S. Cl.
CPC ......... *H04B 13/02* (2013.01); *E21B 41/0007* (2013.01)

(58) Field of Classification Search
None
See application file for complete search history.

(56) References Cited

U.S. PATENT DOCUMENTS

| | | |
|---|---|---|
| 2005/0036404 A1 | 2/2005 | Zhu |
| 2016/0236760 A1 | 8/2016 | Siesjo |
| 2017/0113768 A1* | 4/2017 | Jamieson ............... B63G 8/001 |
| 2018/0224568 A1* | 8/2018 | Brizard ................ G01V 1/3835 |
| 2018/0302504 A1* | 10/2018 | Petrioli .................... H04L 69/18 |
| 2019/0011565 A1* | 1/2019 | Embry ..................... B63G 8/38 |
| 2020/0052799 A1* | 2/2020 | Jarrot ..................... H04B 11/00 |

FOREIGN PATENT DOCUMENTS

| | | | |
|---|---|---|---|
| JP | 2021116019 A | | 8/2021 |
| KR | 20120071228 A | * | 7/2012 |
| WO | WO-2004049604 A1 | * | 6/2004 ............. H04B 11/00 |

(Continued)

OTHER PUBLICATIONS

KR-20120071228-A English Language Translation (Year: 2012).*

(Continued)

*Primary Examiner* — Curtis A Kuntz
*Assistant Examiner* — Jerold B Murphy
(74) *Attorney, Agent, or Firm* — Jeffrey D. Frantz (57) ABSTRACT

A resource extraction system includes a plurality of access points disposed on a plurality of underwater production assets. The plurality of access points are communicatively coupled via a wired connection to a data processing system located above-sea and configured to wirelessly communicate underwater. The resource extraction system also includes an underwater vehicle that has communication circuitry configured to wirelessly communicatively couple the underwater vehicle to the plurality of access points to establish a connection with the data processing system via at least one of the plurality of access points. The underwater vehicle also includes processing circuitry operatively coupled to the communication circuitry.

14 Claims, 7 Drawing Sheets

(56) References Cited

FOREIGN PATENT DOCUMENTS

WO    WO-2007143457 A2 * 12/2007 ............. B63G 8/001
WO       2020092903 A1    5/2020

OTHER PUBLICATIONS

Caiti et al., Linking Acoustic Communications and Network Performance: Integration and Experimentation of an Underwater Acoustic Network (Year: 2013).*
Patel, Bellhop Acoustic Toolbox (Year: 2020).*
Guerra, et al., Performance Evaluation of Random and Handshake-Based Channel Access in Collaborative Mobile Underwater Networks (Year: 2010).*
Fabbri et al., Optimizing environmentally-conditioned communications in an underwater autonomous network (UAN) through acoustic models and experimental data: results from LCAS 18 (Year: 2020).*
Wikipedia, "OSI model", available at <https://en.wikipedia.org/wiki/OSI_model>, originally accessed Aug. 2019 <https://en.wikipedia.org/w/index.php?title=OSI_model&oldid=911501754>, 7 pages.
Open Hardware Repository, "White Rabbit", available at <https://ohwr.org/projects/white-rabbit>, originally accessed Aug. 2019 at <https://ohwr.org/project/white-rabbit/wikis/Home?version_id=f656c25988548e995c4cb7baef2e127d29d1567e>, 2 pages.
M. Stojanovic, P.P. Beaujean. "Acoustic communication." In Springer Handbook of Ocean Engineering, pp. 359-386, 2016, accessed at <chrome-extension://efaidnbmnnnibpcajpcglclefindmkaj/http://millitsa.coe.neu.edu/publications/book/handbook-chap5.pdf>.
E. M. Sozer, M. Stojanovic and J. G. Proakis, "Underwater acoustic networks," in IEEE Journal of Oceanic Engineering, vol. 25, No. 1, pp. 72-83, Jan. 2000.
D. Pompili and I. F. Akyildiz, "Overview of networking protocols for underwater wireless communications," in IEEE Communications Magazine, vol. 47, No. 1, pp. 97-102, Jan. 2009.
M. Jouhari, K. Ibrahimi, H. Tembine and J. Ben-Othman, "Underwater Wireless Sensor Networks: A survey on enabling technologies, localization protocols, and Internet of Underwater Things," in IEEE Access, vol. 7, 2019, pp. 96879-96899.
Vickery, "Acoustic Positioning Systems: 'A Practical Overview of Current Systems'", Dynamic Positioning Conference, Oct. 1998, 16 pages, available at <https://dynamic-positioning.com/proceedings/dp1998/SVickery.PDF>.
Search Report and Written Opinion issued in the PCT Appliction No. PCT/US2023/079848 dated Mar. 15, 2024, 10 pages.

* cited by examiner

UNDERWATER COMMUNICATION NETWORK FOR AUTONOMOUS UNDERWATER VEHICLES

BACKGROUND

The present disclosure relates generally to underwater wireless communication, such as wireless communication involving autonomous underwater vehicles.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Fluids (e.g., hydrocarbons) may be extracted from subsurface reservoirs and transported to the surface for commercial sales, such as for use in the power industry, transportation industry, manufacturing industry, and other applicable industries. For example, a well may be drilled into the ground to a subsurface reservoir, and equipment may be installed in the well and on the surface to facilitate extraction of the fluids. In some cases, the wells may be offshore (e.g., subsea), and the equipment may be disposed underwater, on offshore platforms, and/or on floating systems.

Underwater assets, such as drill centers (or components thereof), may be inspected for various reasons. For example, underwater vehicles may be deployed to approach individual underwater production assets to acquire camera imagery and/or other sensor measurements that allow the states of the assets to be assessed. Inspections may be performed by human divers or remotely operated vehicles (ROVs) that are tethered to support vessels on the surface. Typically, such inspections use a tether, or a physical connection, from the ROV to perform the inspection. However, using a tether can be relative difficult from a logistics standpoint in terms of deploying a ROV and collecting data from the ROV. For example, communication with the ROV may be difficult, and it may also be difficult to determine the location or the ROV. Accordingly, it may be beneficial to perform inspections utilizing techniques that do not use a tether or other direct physical connection to communicatively couple an inspection vehicle to a surface vessel.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

To enable communication between an underwater inspection vehicle and a surface vessel in an enhanced manner (e.g., high bandwidth, low latency manner), an underwater communication network may be established in which underwater production assets may be communicatively coupled to a surface vessel using a physical connection. In certain embodiments, the underwater production assets may include subsea pipelines, compressors, pumps, turbines, valves, actuators, manifolds, Christmas trees, control systems and various controllers, monitoring systems and various sensors, fluid injection systems, or any combination thereof. The underwater production assets may also include access points (e.g., wireless communication circuitry) that enable the underwater production assets to wirelessly (e.g., using acoustic signals) communicate with inspection vehicles. As such, inspection vehicles may communicate with the surface vessel via the access points provided by the underwater production assets. Utilizing the underwater communication network may enable data to be communicated with reduced packet loss, higher bandwidth, and lower latency. Furthermore, the underwater communication network may be harnessed to accurately determine the location of the inspection vehicle, which may aid the inspection vehicle in performing inspection, maintenance, and repair activities.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the elements.

As explained above, underwater assets, such as drill centers (or components thereof), may be inspected for various reasons. For example, underwater vehicles may be deployed to approach individual underwater production assets to acquire camera imagery and/or other sensor measurements that allow the states of the assets to be assessed. In certain embodiments, the underwater production assets may include subsea pipelines, compressors, pumps, turbines, valves, actuators, manifolds, Christmas trees, control systems and various controllers, monitoring systems and various sensors, fluid injection systems, or any combination thereof. Inspections may be performed by human divers or remotely operated vehicles (ROVs) that are tethered to support vessels on the surface. Typically, such inspections use a tether, or a physical connection, from the ROV to perform the inspection. However, using a tether can be relative difficult from a logistics standpoint in terms of deploying a ROV and collecting data from the ROV. For example, communication with the ROV may be difficult, and it may also be difficult to determine the location of the ROV.

In certain embodiments disclosed herein, to enable communication between an underwater inspection vehicle and a surface vessel in an enhanced manner (e.g., high bandwidth, low latency manner), an underwater communication network may be established in which underwater production assets may be communicatively coupled to a surface vessel using a physical connection. The underwater production assets may also include access points (e.g., wireless communication circuitry or wireless access points) that enable the underwater production assets to wirelessly (e.g., using acoustic signals) communicate with inspection vehicles. As such, inspection vehicles may communicate with the surface vessel via the access points provided by the underwater production assets. Utilizing the underwater communication network may enable data to be communicated with reduced packet loss, higher bandwidth, and lower latency. Furthermore, the underwater communication network may be harnessed to accurately determine the location of the inspection vehicle, which may aid the inspection vehicle in performing inspection, maintenance, and repair activities.

Figure 1:
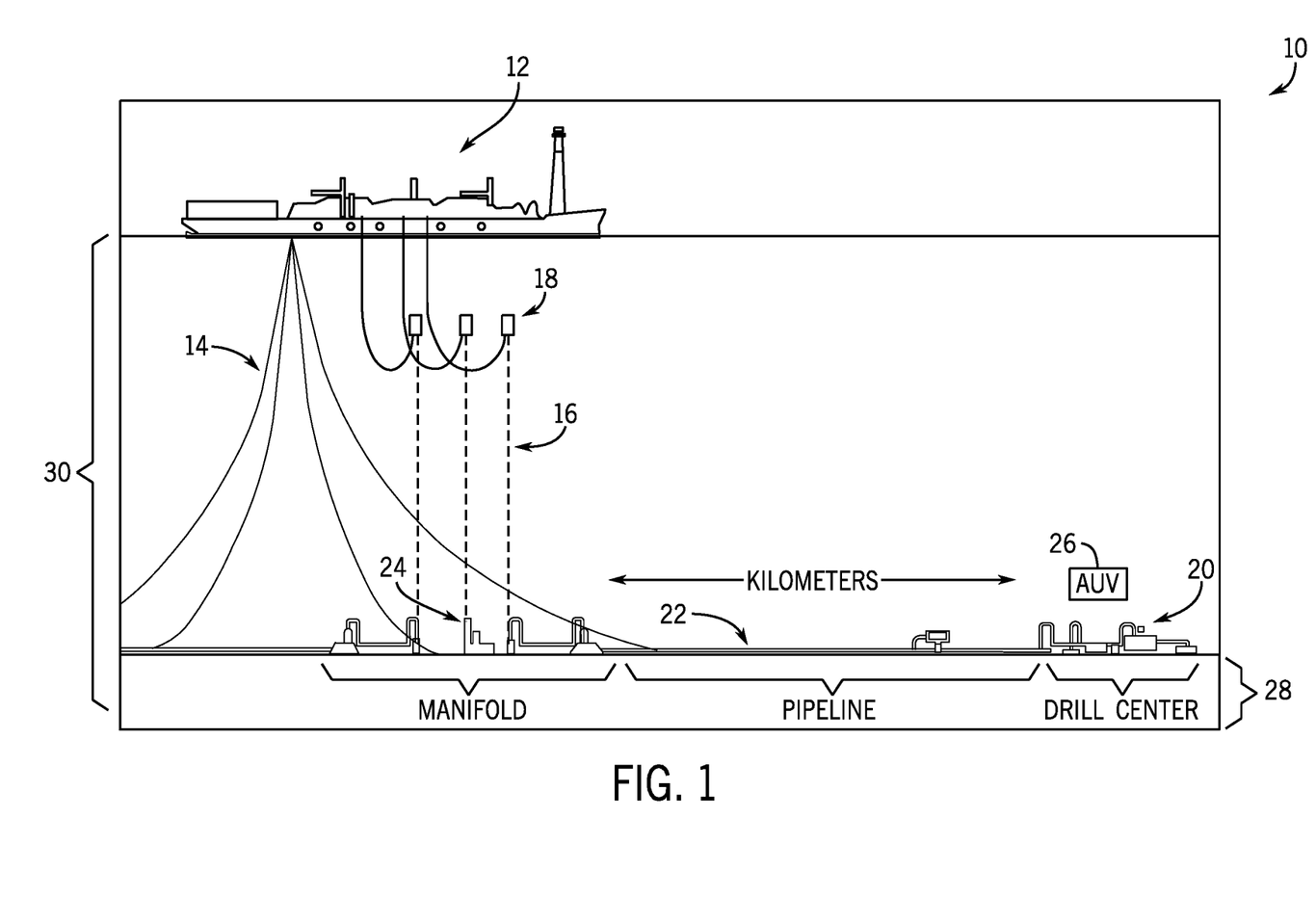
FIG. 1 is a block diagram of a resource extraction system, in accordance with an embodiment of the present disclosure.

By way of introduction, FIG. 1 is a block diagram of an embodiment of a resource extraction system 10. The resource extraction system 10 may be configured to extract various minerals and natural resources, including hydrocarbons (e.g., oil and/or natural gas) from the earth, or the resource extraction system may be configured to inject substances into the earth. While resource extraction may be land-based, the illustrated resource extraction system 10 is a sea-based system that may be utilized for subsea resource extraction. As illustrated, the resource extraction system 10 includes a floating producing storage and offloading (FPSO) unit 12, mooring lines 14, risers 16, flotation devices 18, a drill center 20, a pipeline 22, a manifold 24, and an autonomous underwater vehicle (AUV) 26. As discussed below, the AUV 26 may communicate with the FPSO unit 12 (or computing devices included therein) via a wireless connection with subsea equipment (e.g., underwater production assets such as components or equipment of the drill center 20, manifold 24, or pipeline 22). Further, while the illustrated resource extraction system 10 includes an FPSO unit 12, it should be noted that in some embodiments, the resource extraction system 10 may include other equipment and the techniques described herein with regard to the resource extraction system may be used in other sub-based or subsea systems. For example, in some embodiments, the resource extraction system 10 may include a platform (e.g., offshore platform or oil platform), and the techniques described herein may be utilized in conjunction with the platform (e.g., in lieu of or in addition to the FPSO unit 12). As another example, in some embodiments (e.g., in which the resource extraction system 10 is located in a shallow water environment), the manifold 24 or pipeline 22 (or both) may transfer collected hydrocarbons directly to a land export facility (e.g., in lieu of being transferred to a vessel such as the FPSO unit 12).

The FPSO unit 12 is a vessel such as a ship that may be used for the production and processing of hydrocarbons as well as for storing hydrocarbons or oil. The FPSO unit 12 may be secured in place by the mooring lines 14, which may anchor (e.g., via anchors attached to ends of the mooring lines 14) the FPSO unit 12 to seafloor 28. The FPSO unit 12 may receive hydrocarbons from subsea equipment (e.g., equipment or vessels located underwater in subsea environment 30), process the hydrocarbons, and store oil (e.g., a product of processing hydrocarbons) until the oil or other product(s) generated from processing the hydrocarbons can be offloaded (e.g., onto a tanker). For example, risers 16 (which may be attached to the flotation devices 18, may extend between the FPSO unit 12 and subsea equipment (e.g., the manifold 24) to transfer fluid between the FPSO unit 12 and subsea equipment such as the manifold 24, pipeline 22, and drill center 20. For instance, the FPSO unit 12 may transfer fluid to the manifold 24 (and the pipeline 22 and the drill center 20 via the manifold 24) used to extract hydrocarbons via the risers 16, and the risers 16 may also transfer hydrocarbons collected by the drill center 20 to the FPSO unit 12. As will be discussed in more detail below with respect to FIG. 2, the FPSO unit 12 may include computing devices (e.g., computers, data processing centers, servers, or other computing devices having one or more processors, memory, and instructions) that may communicate with subsea equipment (e.g., the AUV 26 or underwater production assets such as the manifold 24 (or one or more components thereof), the pipeline 22 (or one or more components thereof), the drill center 20 (or one or more components thereof)).

The drill center 20 may include wells from which hydrocarbons or minerals are extracted. The drill center may include underwater production assets such as, but not limited to, wellheads, wellhead hubs that provide connections between wellheads and wells, Christmas trees, production manifolds, and pumps. Christmas tree are assemblies that may include valves, casing spools, and fittings that are used to regulate the flow of pipes in the wells. A production manifold may be connected to the Christmas trees (e.g., via piping), receive hydrocarbons from the wells, comingle the hydrocarbons, and send the hydrocarbons to the pipeline 22. The pipeline 22 may be used to transfer fluids between the drill center 20 and the manifold 26. The manifold 26 may distribute fluids received from the FPSO unit 12 (via the risers 16) to the drill center 20 via the pipeline 22 or to other drill centers that may be connected to the manifold 26 via one or more other pipelines. Additionally, the manifold 26 may receive fluids (e.g., collected hydrocarbons) from the drill center 20 via the pipeline 22 as well as from other drill centers that may be connected to the manifold 26 via other pipelines. Furthermore, the manifold 26 may provide (e.g., with or without the aid of pumps) the fluids to the FPSO unit 12 via the riders 16.

The AUV 26 may be an unmanned, autonomous vehicle that operates in the subsea environment. In particular, the AUV 26 may perform tasks related to inspecting, maintaining, and repairing components of the resource extraction system 10 (or components thereof) located in the subsea environment 30, such as but not limited to the drill center 20, the pipeline 22, the manifold 24, and the risers 16. Accordingly, the AUV may include lights, sensors, cameras, mechanical elements (e.g., gripping devices, robotic arms, torque tools, linearly movable tools, actuators, or other tools) and other equipment that may be used to inspect, maintain, and repair elements of the resource extraction system 10 located in the subsea environment 30. As discussed below, the AUV 26 may be communicatively coupled to the FPSO unit 12 via subsea components of the resource extraction system 10 to which the AUV is wirelessly communicatively coupled.

Figure 2:
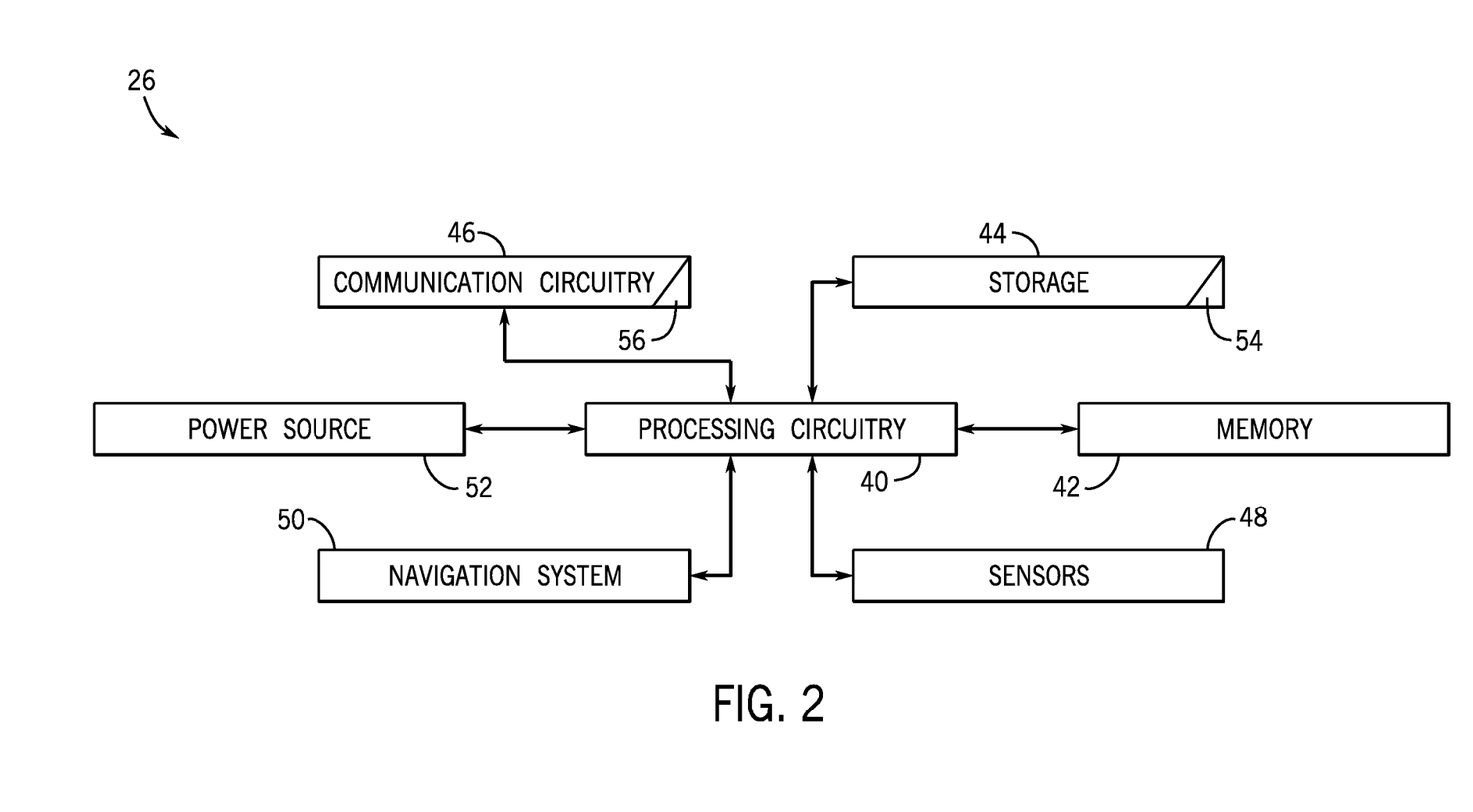
FIG. 2 is a block diagram of the autonomous underwater vehicle of FIG. 1, in accordance with an embodiment of the present disclosure.

Before proceeding to discuss FIG. 2, it should be noted that the resource extraction system 10 may include any suitable number of its components and that the techniques described herein are not limited solely to the resource extraction system 10 illustrated in FIG. 1. For example, in some embodiments, the resource extraction system 10 may include multiple drill centers, pipelines, manifolds, sets of risers. Similarly, the resource extraction system 10 may include multiple AUVs, in which case each of the AUVs may communicate in accordance with the techniques described herein.

FIG. 2 is a block diagram of the AUV 26. As illustrated, the AUV 26 includes processing circuitry 40, memory 42, storage device 44, communication circuitry 46, sensors 48, a navigation system 50, and a power source 52. The various components described in FIG. 2 may include hardware elements (e.g., circuitry), software elements (e.g., instructions stored on a tangible, non-transitory computer-readable medium), or a combination of both hardware and software elements. It should be noted that the various depicted components may be combined into fewer components or separated into additional components. For example, the memory 42 and the storage device 44 may be included in a single component.

The processing circuitry 40 may execute instructions stored in the memory 42 and/or the storage device 44 to perform various tasks such as, but not limited to, controlling the AUV 26 or components thereof, processing data, causing data to be transmitted, or determining a location of the AUV 26. As such, the processing circuitry 40 may include one or more general purpose microprocessors, one or more application specific processors (ASICs), one or more field programmable logic arrays (FPGAs), or any combination thereof.

The memory 42 and/or the storage device 44 may be tangible, non-transitory, computer-readable mediums that store instructions executable by and data to be processed by the processing circuitry 40. For example, the memory 42 may include random access memory (RAM) and the storage device 44 may include read only memory (ROM), rewritable non-volatile memory such as flash memory, hard drives, optical discs, and the like. By way of example, a computer program product containing the instructions may include an operating system or an application program. For example, the storage device 44 (or memory 42) may include an application 54 that the processing circuitry 40 may execute in order to facilitate communication between the AUV 26 and subsea devices and determine a location of the AUV 26 based on such communication. The processing circuitry 40 may also execute the application 54 to perform control operations as well as to manage or process data received from subsea devices.

Utilizing the communication circuitry 46, the AUV 26 may (wirelessly) communicatively couple to subsea devices. As also discussed below with respect to FIG. 3, the AUV 26 may communicatively couple to above-sea (e.g., off-shore) devices and/or surface devices via one or more subsea devices. The communication circuitry 46 may include one or more transmitters, receiver, transceivers, antenna, and other communication circuitry 46 that enable the AUV 26 to wirelessly communicate with other devices in the subsea environment 30. For example, the communication circuitry 46 may include a wireless acoustic modem 56 that may modulate signals generated by (or received from) the processing circuitry 40 and cause the modulated signals to be transmitted to subsea devices. Additionally, the wireless acoustic modem 56 may demodulate signals received from subsea devices and send the demodulated signals to the processing circuitry 40, for example, to be processed. More specifically, the wireless acoustic modem 56 may include an underwater transducer that converts received signals (e.g., acoustic signals) into electrical signals, an analog transceiver that may transmit and receive acoustic signals, analog-to-digital conversion circuitry, digital-to-analog conversion circuitry, and a processing circuitry (e.g., a digital hardware platform) for control and signal processing. The wireless acoustic modem 56 may operate using any suitable form of acoustic communication (e.g., protocols or standards) that enable wireless communication between the AUV 26 and subsea devices in the subsea environment 30. In one embodiment, the wireless acoustic modem 56 may operate using any suitable frequency or frequency range outside of the frequency range of twenty to sixty kilohertz (KHz). Additionally, the wireless acoustic modem 56 may utilize various types of modulation such as frequency-shift keying, phase-shift keying, frequency-hopping spread spectrum, direct-sequence spread spectrum, frequency and pulse-position modulation, multiple frequency-shift keying, and orthogonal frequency-division multiplexing for underwater acoustic communications.

The AUV 26 may also include sensors 48, which may be utilized to aid in determining the location of the AUV 26 as well as to perform inspection, maintenance, and repair operations. For example, the sensors 48 may include ultrasonic sensors (e.g., sonar sensors), cameras, lidar sensors, laser scanners, chemical sensors. The sensors 48 collect data, for example, regarding the position of the AUV 26 (e.g., relative to the seafloor or subsea equipment), and the processing circuitry 40 may process the sensor data to determine the location of the AUV 26. The sensors 48 may also include lights, which may enable certain sensors (e.g., cameras) to collect suitable data (e.g., image data) in the subsea environment 30, which may be relatively dark (e.g., compared to above-sea environments).

The navigation system 50, which may include one or more of the sensors 48, may include components the AUV 26 utilizes for movement. For example, the navigation system 50 may include one or more motors that couple to propellers (or other propulsion devices such as thrusters) to enable propulsion and/or steering of the AUV 26. As the AUV is autonomous, the processing circuitry 40 may control the navigation system 50 (e.g., using the application 54) to determine a location of the AUV 26 and cause the AUV 26 to move throughout the subsea environment 30.

The power source 52 may include any suitable source of energy, such as a rechargeable lithium polymer (Li-poly) battery and/or an alternating current (AC) power converter. In some embodiments, the power source 26 may include fuel cells or fuel and one or more components that generate electrical power from the fuel or fuel cells.

Figure 3:
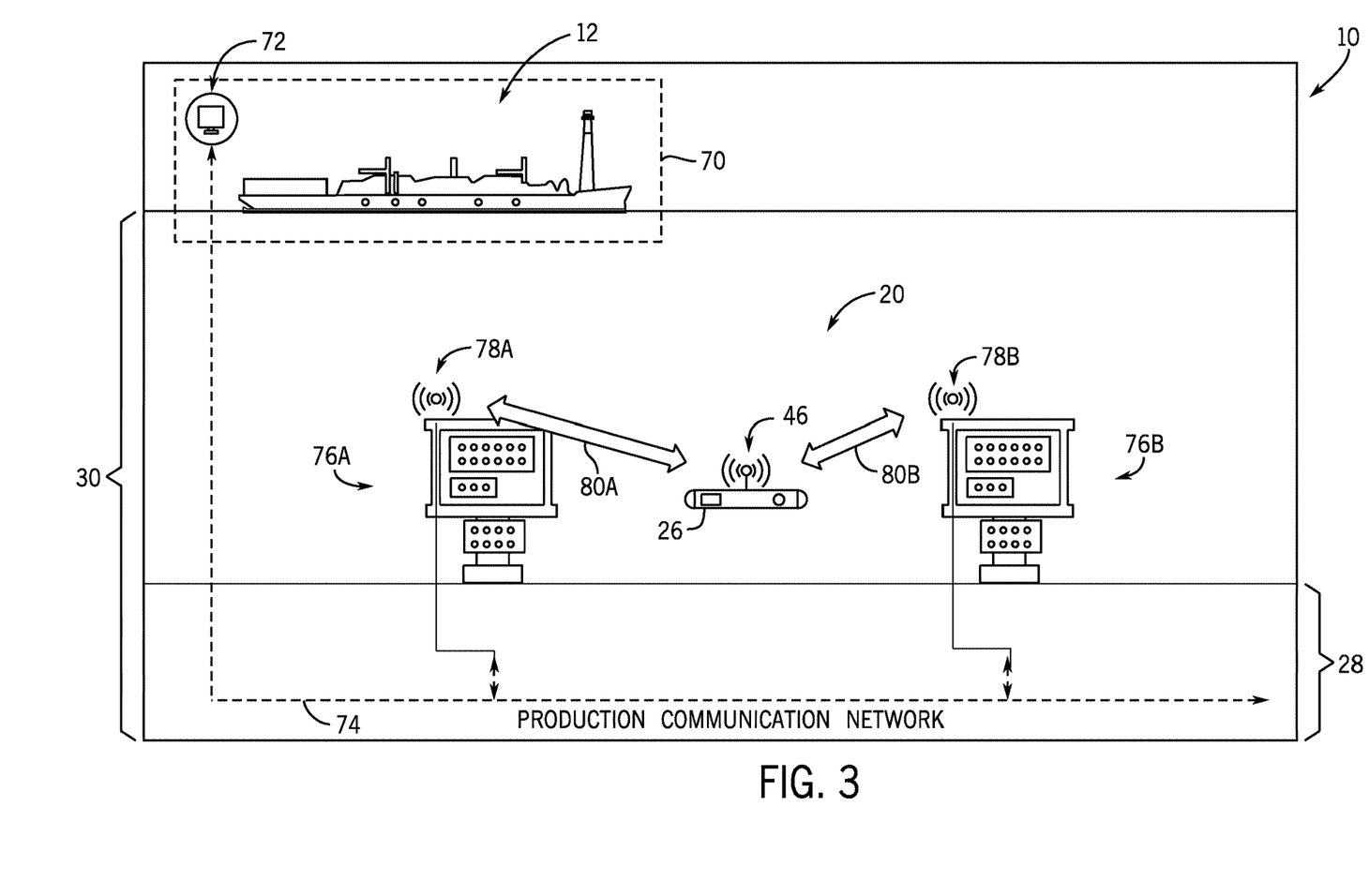
FIG. 3 is another block diagram of the resource extraction system of FIG. 1 illustrating wireless communication between the autonomous underwater vehicle and underwater production assets, in accordance with an embodiment of the present disclosure.

Continuing with the drawings, FIG. 3 is another drawing of the resource extraction system 10 from a different perspective than FIG. 1. In particular, FIG. 3 is provided to help illustrate techniques of the present application related to communication between the AUV 26 and one or more computing devices that may be utilized to control the AUV 26, perform processing on data collected by the AUV 26, determine a location of the AUV 26, or a combination thereof.

As illustrated, the resource extraction system 10 includes top-side production infrastructure 70, which may include the FPSO 12 and a data processing system 72. With that said, in other embodiments of the resource extraction system 10, the data processing system 72 may be located on the FPSO 12 or elsewhere, such as onshore, on an oil platform, or subsea. The data processing system 72 may include one or more computing devices, including servers and cloud-based computing devices or systems, which may include processing circuitry that can execute machine-readable instructions to perform various operations, such as processing data received from subsea devices, making determinations based on the received data (e.g., determining a location of the AUV 26), and controlling one or more operations of subsea devices. As such, the data processing system 72 may be partially physically located on the FPSO 12 and partially implemented off the FPSO 12. In other embodiments, the data processing system 72 may be partially physically located subsea, on the FPSO 12, off the FPSO 12, or a combination thereof. In some instances, the processing circuitry may perform machine learning or execute a machine-learning (or artificial intelligence) application that may be utilized to perform or control operations associated with the resource extraction system 10. Further, the resource extraction system 10 may include a production communication network 74 that may communicatively couple the data processing system 72 to components on the drill center 20, such as Christmas tree 76A and Christmas tree 76B (which may be collectively referred to as "Christmas trees 76"). The production communication network 74 may include cables (e.g., fiber-optic cables) that extend (e.g., hundreds of feet, thousands of feet, or several miles) between the top-side production infrastructure 70 and subsea devices such as the Christmas trees 76. Before further discussion of FIG. 3, it should be noted that the production communication network 74 is not limited to being coupled to the drill center 20 or components of the drill center 20 such as the Christmas trees 76. In other words, in other embodiments, the production communication network 74 may communicatively couple the data processing system 72 to other components of the drill center 20 or to subsea components or devices included in the resource extraction system such as components or devices included in the pipeline 22, the manifold 24, and the riser 16.

The AUV 26 may communicate with the data processing system 72 via subsea devices and the production communication network 74. For example, as illustrated, the Christmas tree 76A may include access point 78A, and the Christmas tree 76B may include access point 78B. The access points 78 (referring collectively to the access point 78A and the access point 78B) may be or include wireless communication circuitry such as acoustic modems or transmitters, receivers, transceivers or a combination thereof that enables underwater wireless communication to occur between the Christmas trees 76 and the AUV 26. For instance, the Christmas tree 76A may be wirelessly communicatively coupled to the AUV 26 via a first communication channel 80A, while the Christmas tree 76B may be wireless communicatively coupled to the AUV 26 via a second communication channel 80B. Because the Christmas trees 76 are connected to the production communication network 74, data may be sent from the data processing system 72 via the production communication network 74 to the Christmas trees 76, which may send the data to the AUV 26. Similarly, the AUV 26 may send data to the Christmas trees 76, which may send the data via the production communication network 74 to the data processing system 72. Accordingly, communication between the AUV 26 and the data processing system 72 may be performed partially wirelessly (e.g., using acoustic communication techniques) and partially using wired communication techniques (e.g., communication via the production communication network 74).

By facilitating communication between the AUV 26 and the data processing system 72 using the access points 78, signal loss and distortion that may occur when long-distance (acoustic) communication channels are used or due to surface environmental noise may be mitigated. Indeed, the techniques described herein provide robust communication in between the seabed and the surface. For example, because wireless communication in between the AUV 26 can be limited to short range (e.g., less than 100 feet, less than 50 feet, less than 20 feet, less than 10 feet), communication issues that are linked to surface infrastructure distortion and noise can be substantially reduced or eliminated. Furthermore, the techniques enable higher data throughput to the surface without data loss. Accordingly, as the AUV 26 performs inspection, maintenance, and repair operations, data generated by the sensors 48—which may be generated at a rate faster than what may be communicable with longer range acoustic communication techniques—may be communicated to the data processing system 72 via relatively shorter range wireless communication with subsea equipment and the production communication network 74.

Furthermore, it should also be noted that the communication latency is much reduced. Over long distances, in open water the latency can be in the range of a few seconds due to the slow propagation of sound in the water. Accordingly, the presently disclosed techniques provide a better real-time link in between the AUV 26 and the surface (e.g., the data processing system 72). Reducing latency also improves uplink and downlink usability. For example, for the uplink, the techniques described herein enable surface users an improved real-time awareness of the mission execution. The reduced latency on the downlink also allows the user to change some of the mission parameters and pass them to the AUV 26 more quickly and without having to take into consideration the latency.

Figure 4:
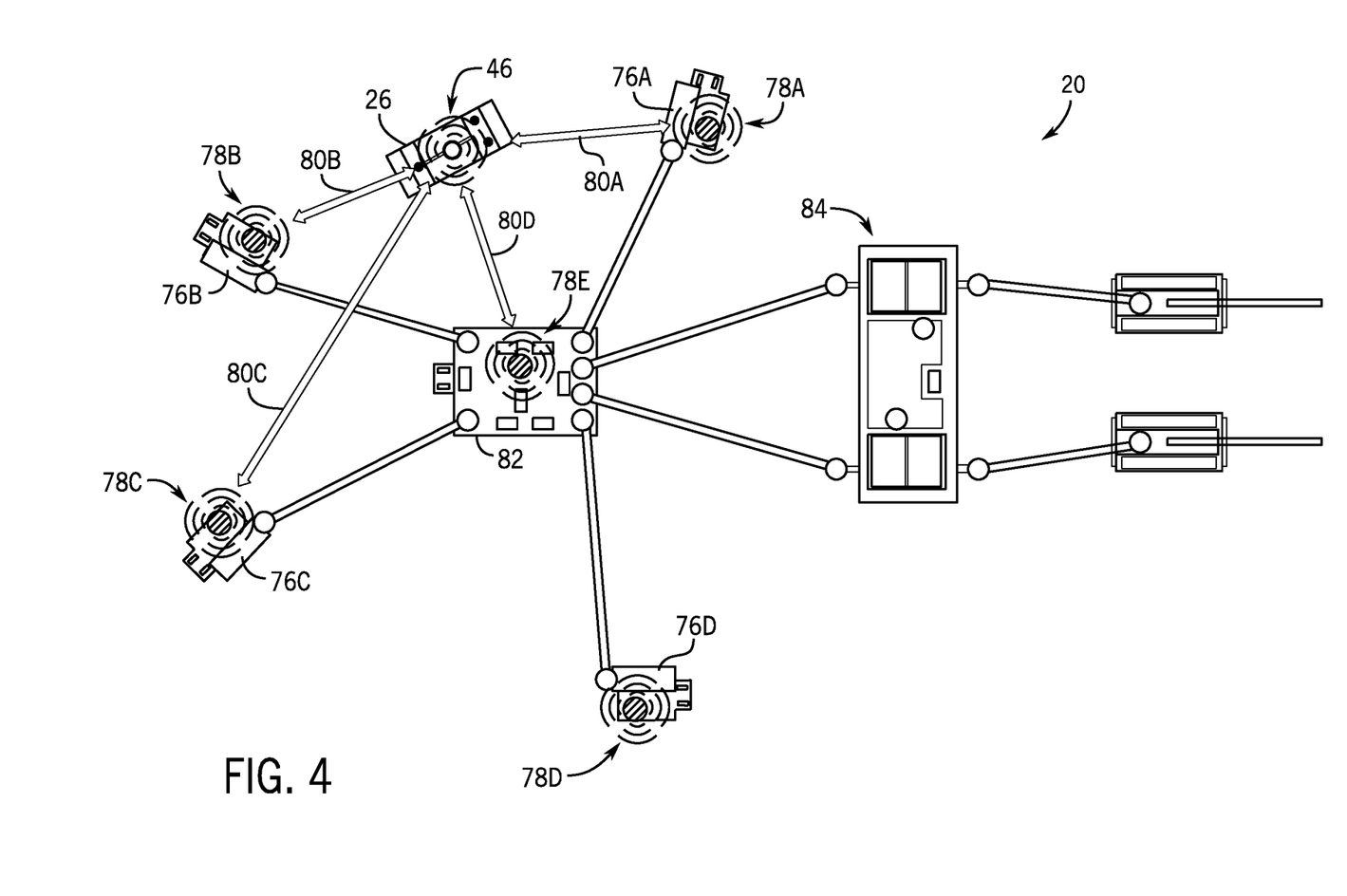
FIG. 4 is a top view of the drill center of FIG. 3, in accordance with an embodiment of the present disclosure.

FIG. 4 provides more context and examples of devices with which the AUV 26 may wirelessly communicate. In particular, FIG. 4 is a top view of the drill center 20, which includes the Christmas tree 76A, the Christmas tree 76B, Christmas tree 76C, Christmas tree 76D, production manifold 82, and fluid routing equipment 84 (e.g., to route fluids between the production manifold 82 and the pipeline 22). As illustrated, the Christmas tree 76A has the access point 78A, the Christmas tree 76B has the access point 78B, the Christmas tree 76C has the access point 78C, the Christmas tree 76D has the access point 78D, and the production manifold 82 has the access point 78E. The access points 78 (referring collectively to the access points 78A-78E) may function as the access points 78A, 78B are described above with respect to FIG. 3. That is, the access points 78 may be acoustic modems or other wireless communication circuitry that enable a subsea device (e.g., in the case of FIG. 4, one of the Christmas trees 76A-76D or the production manifold 82) to wirelessly communicate with the AUV 26. For example, the Christmas tree 76A may be wirelessly communicatively coupled to the AUV 26 via the first communication channel 80A, the Christmas tree 76B may be wireless communicatively coupled to the AUV 26 via the second communication channel 80B, the Christmas tree 76C may be wirelessly communicatively coupled to the AUV 26 via a third communication channel 80C, and the production manifold 82 may be wireless communicatively coupled to the AUV 26 via a fourth communication channel 80D. As the AUV 26 moves underwater, communication channels may be gained or lost, for example, depending on how far or close to an access point 80 the AUV 26 is located. Accordingly, the access points 78 may enable (overlapping) wireless coverage within a subsea site (e.g., the drill center 20), thereby enabling the AUV 26 to be wirelessly communicatively coupled to one or more access points 78 (and the data processing system 72 via the access points 78 and production communication network 74). As such, even when the AUV 26 is hundreds or thousands of feet underwater, the AUV 26 may maintain a communicative coupling to the data processing system 72.

Furthermore, each of the Christmas trees 76A-76D, the production manifold 82, and the fluid routing equipment 84 (or portions of the fluid routing equipment 84) may include access points 78 and be coupled to the production communication network 74 (as discussed above with respect to FIG. 3). Accordingly, each subsea device of FIG. 4 (e.g., the Christmas trees 76A-76D, the production manifold 82, and the fluid routing equipment 84) may enable communication between the AUV 26 and top-side equipment, such as the data processing system 72.

As discussed above, the AUV 26 may communicate with several access points 78, which may be or include acoustic modems. In some cases, the acoustic modems may be half-duplex, in which case it may be desirable to manage channel access for uplink and downlink. Furthermore, some adjustment of the signal processing on an acoustic channel may be desirable to provide higher reliability performance to better address specific communication challenges associated with underwater environments. For instance, in underwater environments, there may be limited bandwidth available, slow propagation time, Doppler distortions, and fast varying channel conditions as well as the bending of the acoustic rays (e.g., shadow zones). Moreover, in the case multiple point-to-point communication, where multiple transmitters (e.g., of multiple acoustic modems) are transmitting to one or multiple receivers, interference may occur (e.g., due to a transmitter accessing (or attempting to access)) on the acoustic channel being used by another transmitter.

While specific timeslots (e.g., predetermined timeslots) during which each transmitter can transmit could be used or specific frequencies or frequency bands could be used (e.g., using frequency-division multiplexing), such approaches may be best suited if the data rate to be transmitted can be predicted in advance because the timeslots or frequency bands could be adjusted to reflect the bandwidth to be consumed. However, using such techniques may not easily allow for dynamic adaptation of data rate and, in the case of using predetermined time slots, may also involve the addition of time guards at the timeslot boundary to accommodate for the worst-case transit time scenario in the acoustic channel. Furthermore, in case of lower data rate and non-cooperative scenarios, the acoustic channel may be initially probed by equipment (e.g., acoustic modems or transmitter circuitry or receiver circuitry) to evaluate the availability of the channel. If the channel is available, the equipment sends a data packet and waits for the receiver to acknowledge the message. If the acknowledgement is not received after a given time, the packet is sent again until the acknowledgement is received.

Figure 5:
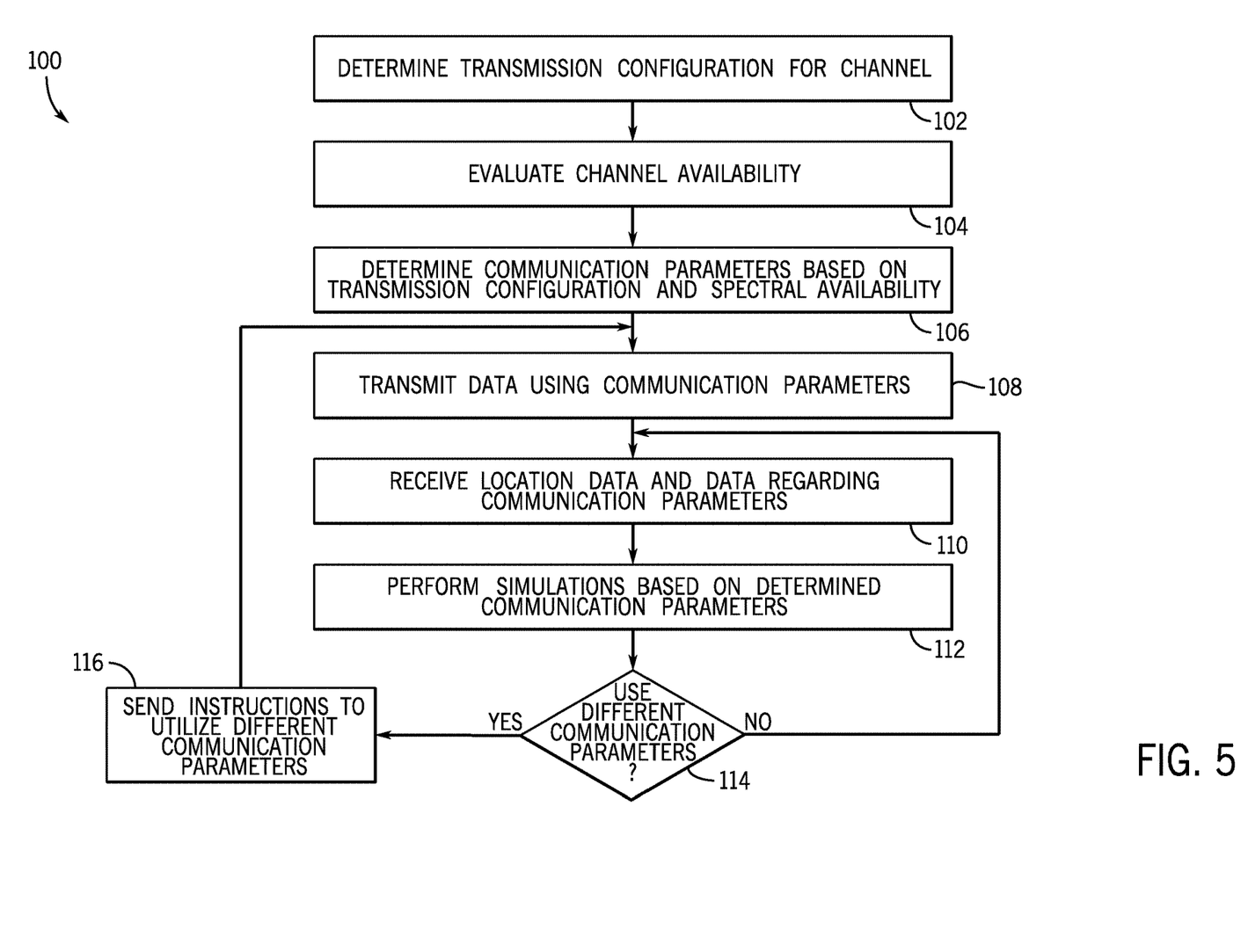
FIG. 5 is a flow diagram of a process for establishing a wireless connection and communicating data on a wireless communication channel of FIG. 3 or FIG. 4, in accordance with an embodiment of the present disclosure.

As an alternative to such an approach, point-to-point communication for underwater networks may be carried out using a cross-layer approach, which is discussed below with respect to FIG. 5. In particular, FIG. 5 is flow diagram of a process 100 for establishing a wireless connection and communicating data on a communication channel 80. The process 100 may be performed by the resource extraction system 10 or components thereof, such as the data processing system 72, the processing circuitry 40 or communication circuitry 46 of the AUV 26, processing circuitry operatively coupled to an access point 78 (e.g., processing circuitry included in one or more components of the drill center 20, such as a Christmas tree, on which the access point 78 is positioned). Furthermore, while operations of the process 100 are described in one order below, it should be noted that, in other embodiments, the operations may be performed in a different order, one or more of the operations may be omitted, or both. For example, in one embodiment, the process 100 may include performing the operations discussed below that are associated with process block 102, process block 104, process block 106, process block 108 while omitting the operations described below that are associated with process block 110, process block 112, decision block 114, and process block 116.

At process block 102, the data processing system 72, the processing circuitry 40 or communication circuitry 46 of the AUV 26, processing circuitry operatively coupled to an access point 78, or a combination thereof, may determine a transmission configuration for the communication channel 80. The transmission configuration may be a transmission mode that may be selected based on expected usage (e.g., amount of data, duration time the communication channel 80 is expected to be utilized). For instance, one mode may be low power opportunistic short packet transmission, while another mode may be cooperative continuous data transmission.

At process block 104, the data processing system 72, the processing circuitry 40 or communication circuitry 46 of the AUV 26, processing circuitry operatively coupled to an access point 78, or a combination thereof, may evaluate the availability of the communication channel 80 against the transmission configuration determined at process block 102. For example, a spectrum sensing technique may be utilized to determine the availability of the communication channel 80. Accordingly, at process block 104, the data processing system 72, the processing circuitry 40 or communication circuitry 46 of the AUV 26, processing circuitry operatively coupled to an access point 78, or a combination thereof, may determine one or more frequencies (or frequency ranges) at which data may be communicated over the communication channel 80.

At process block 106, processing circuitry operatively coupled to a device that is to transmit data (e.g., the processing circuitry 40 of the AUV 26, the communication circuitry 46 of the AUV 26, or processing circuitry operatively coupled the access point 78) may determine communication parameters to use to transmit the data. The communication parameters may be determined based on the transmission configuration determined at process block 102 and the spectral availability determined at process block 104. Examples of communication parameters that may be determined at process block 106 include, but are not limited to, packet length, data rate, and carrier frequency. In one embodiment, the communication parameters determined at process block 106 may be are selected to optimize or maximize data throughput while minimizing the expected occurrence of data packet collisions with data transmitted by other transmitters (e.g., of other subsea devices such as the AUV 26 or access points 78).

At process block 108, the AUV 26 or access point 78 may transmit data using the communication parameters determined at process block 106. In this way, data may be communicated over the communication channel 80 in a manner that enables high throughput while minimizing the expected occurrence of packet loss (e.g., due to data collisions). As noted above, in some embodiments, the process 100 may terminate with process block 108. However, in other embodiments, additional operations may be performed. These additional operations are described below with respect to process block 110, process block 112, decision block 114, and process block 116.

At process block 110, the data processing system 72 may receive several forms of data associated with subsea components or devices of the resource extraction system 10. For example, the data processing system 72 may receive data regarding the communication parameters determined at process block 106, position data (or data utilized to determine positions) associated with transmitters (e.g., transmitters of access points 78 or the communication circuitry 46 of the AUV 26), and detected physical parameters (e.g., sound speed), which may be measured by the sensors 48 of the AUV or other sensors included in the resource extraction system 10 (e.g., subsea sensors). Position data and determination of the position of the AUV 26 is discussed in greater detail below with respect to FIG. 6 and FIG. 7.

Continuing with the discussion of the process 100, at process block 112, the data processing system 72 may perform simulations based on the data received at process block 110. For example, the data processing system 72 may generate a digital avatar of the AUV 26 (or another subsea transmitter in the resource extraction system 10) along with a digital version of the resource extraction system 10 and simulate acoustic propagation in the communication channel 80 based on the measured physical parameters (e.g., sound speed), the communication parameters utilized to transmit data, as well as the position of the transmitters of the resource extraction system 10 located underwater, such as a transmitter included in the communication circuitry 46 of the AUV 26 and transmitters of the access points 78. By performing the simulations, the data processing system 72 may compare actual or expected communication performance within the resource extraction system 10 against results from simulations that are performed in which different communication parameters are utilized. As such, the data processing system 72 may perform the simulations to further minimize the time guards utilized in the communication channel 80 and to estimate the likelihood of reliable communication between the AUV 26 and one or more of the access points 78. It should be noted that the simulations may be performed partially or wholly using machine-learning or artificial intelligence techniques.

At decision block 114, the data processing system 72 may determine whether different communication parameters should be utilized to transmit data on the communication channel 80, for instance, based on the simulations performed at process block 112. As noted above, by performing the simulations, the data processing system 72 may determine that smaller time guards may be utilized in the communication channel 80, which, if used, could enable higher data throughput and lower latency on the communication channel 80. When the data processing system 72 determines that different time guards should be used, the data processing system 72 may determine that different communication parameters (e.g., the different time guards) should be used. As another example, the data processing system 72 may determine that different communication parameters, if used, may lead to more reliable communication (e.g., higher bandwidth, lower latency, fewer data collisions), and the data processing system 72 may determine that the different communication parameters should be used. In response to determining that different communication parameters should be used, at process block 116, the data processing system 72 may send instructions to the AUV 26 (e.g., via the production communication network 74 and an access point 78) or an access point 78 (via the production communication network 74) to utilize the different communication parameters. In response to receiving the instructions, the AUV 26 or access point 78 may reconfigure its transmitter and transmit data in accordance with the different communication parameters. As such, the process 100 may return to process block 108. The process 100 may subsequently end or continue to repeat any suitable numbers of times. For example, as the AUV 26 moves, different communication parameters may become more suitable, and the different communication parameters may be determined and used.

However, if at decision block 114 the data processing system 72 determines that different communication parameters should not be used, the process 100 may return to process block 110, and the data processing system 72 may continue to receive data, perform simulations, and determine whether other different communication parameters should be utilized. Alternatively, the process 100 may end upon the data processing system 72 determining that different communication parameters should not be used.

Accordingly, by performing the process 100, communication via an underwater data channel may be established between an access point 78 and the AUV 26. Furthermore, by utilizing the process 100, the communication parameters of wireless transmissions between the access point 78 and the AUV 26 via the communication channel 80 may be determined as adjusted to increase the amount of data that can be communicated, increase the speed at which the data can be communicated, and decrease data loss (e.g., due to packet collisions).

By leveraging the communication infrastructure of resource extraction system 10, the position of the AUV 26 may be determined, for example, using acoustic positioning techniques. In such techniques, acoustic signals may be propagated, and the estimation of the time of propagation may be utilized to infer the distance between an acoustic transmitter and an acoustic receiver. More specifically, the access points 78 may be precisely synchronized in time to enable as accurate as possible location determinations, for instance, using a time synchronization protocol on the production communication network 74 that communicatively couples the access points 78. In other words, by utilizing a time synchronization protocol on the wired network that is used to communicatively couple the access points 78 that may wirelessly communicate with the AUV 26, the access points 78 may be precisely time-synchronized (e.g., within a fraction of nanosecond of on another). As discussed below with respect to FIG. 6 and FIG. 7, the position of the AUV 26 may be determined by the data processing system 72 and the AUV 26.

Figure 6:
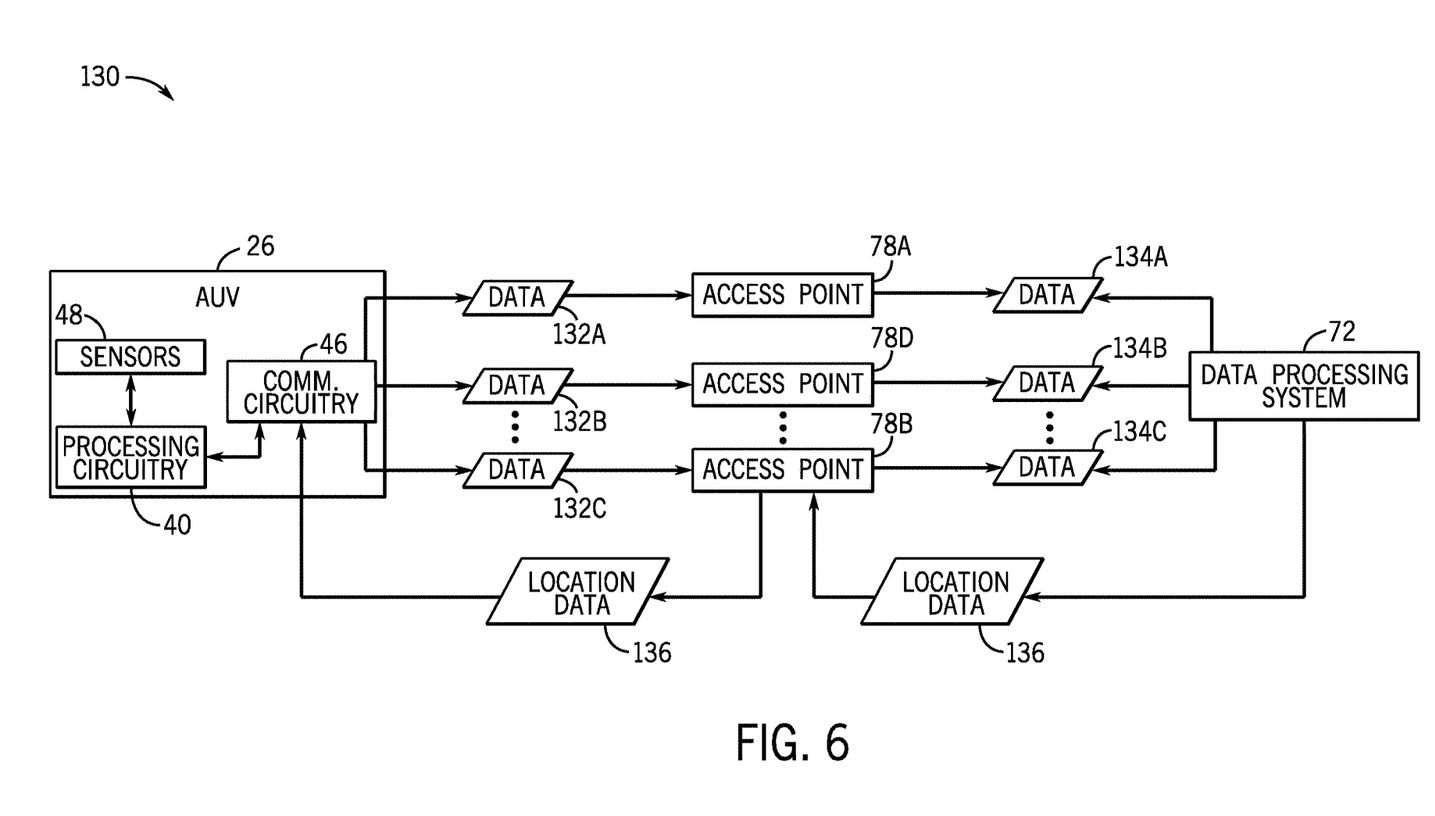
FIG. 6 is a block diagram of the resource extraction system of FIG. 3, in accordance with an embodiment of the present disclosure.

Bearing this is mind, FIG. 6 is a block diagram of a portion 130 of the resource extraction system 10 that includes the data processing system 72, access points 76 (referring collectively to access point 78A, access point 78B, and access point 78D), and the AUV 26. FIG. 6 is also illustrative of an embodiment in which the data processing system 72 determines the location of the AUV 26. As noted above, the access points 78 may be communicatively coupled to one another and the data processing system by a wired connection such as the production communication network 74. As such, the communication circuitry 46 of the AUV 26 may generate data packets 132 (referring collectively to data packets 132A, data packets 132B, and data packets 132C) that may include telemetry data or sensor data (as generated by the sensors 48) and wirelessly transmit the data (e.g., over the communication channels 80). That is, the access points 78 may receive the data packets 132 that are communicated via an acoustic signal. The access points 78 may receive respective data packets 132 as shown in FIG. 6, and digitize, timestamp, and transmit data packets 134 (referring collectively to data packets 134A, data packets 134B, and data packets 134C) to the data processing system 72. For instance, the access points 78 may generate the data packets 134 by re-packetizing the data packets 132 or data included therein and transmit the re-packetized packets to the data processing system 72 via the production communication network 74.

The data processing system 72 may temporally align the received data packets 134 based on their respective timestamps, perform the spatial diversity combining, and decode the telecommunication messages transmitted by the AUV 26. Alternatively, the data packets 132 (e.g., telemetry packets) may be received by the access points 78, and the access points 78 may estimate the times at which the data packets 132 are received (e.g., using signal process techniques). The access points 78 may send data (represented by data packets 134 between the access points 78 and the data processing system 72) indicative of the arrival times or a time difference between when the AUV 26 transmitted the data (e.g., as calculated by determining a difference between a time indicated in an acoustic signal received from the AUV 26 and the time the data was received) to the data processing system 72. In one embodiment, one or more of the access points 78 may bundle the data packets 132 for other access points 78 and send the bundled data to the data processing system 72 (e.g., as an alternative to each access point 78 transmitting its own data separately). The data processing system 72 may determine the position of the AUV 26 based on the data received from the access points 78, for example, by determining distances between the AUV 26 (or a transmitter of the communication circuitry 46 of the AUV 26) and the access points 78 based on the times at which the access points 78 received the data packets 132 from the AUV 26. Using the distances, the location of the AUV 26 may be determined by evaluating potential locations of the AUV 26 in which the AUV 26 would be located at the determined distances from the access points 78. Accordingly, as the AUV 26 is communicatively coupled to more access points 78, it may be possible to more accurately determine the location of the AUV 26.

The data processing system 72 may generate location data 136 and send the location data 136 via the production communication network 74 to one or more of the access points 78 (e.g., access point 78C, which may be the access point 78 located most closely to the AUV 26 or with which the AUV 26 is determined to have the strongest communicative coupling), and the access point(s) 78 may send the location data 136 to the AUV 26. The AUV 26 may then utilize the location data, for example, to reposition itself or to otherwise aid in performing inspection, maintenance, and repair activities.

Figure 7:
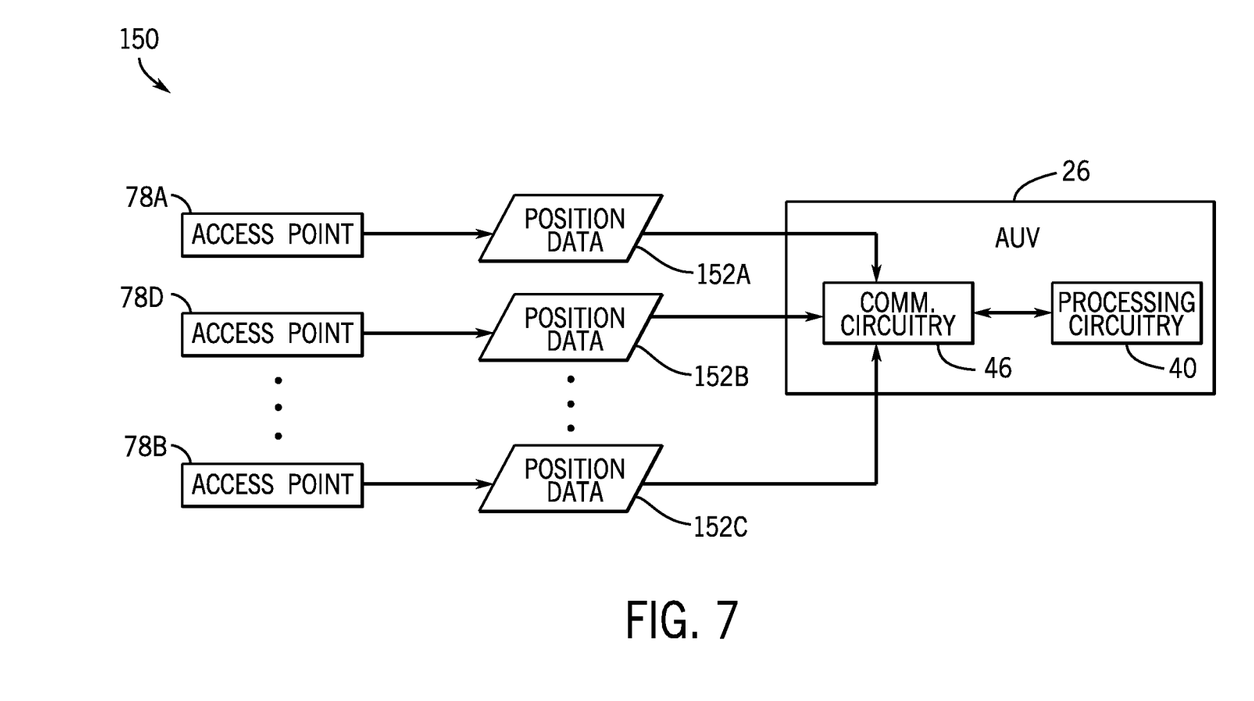
FIG. 7 is a block diagram of the resource extraction system of FIG. 3, in accordance with an embodiment of the present disclosure.

In other embodiments, the AUV 26 may determine its location. For example, FIG. 7 is a block diagram of another portion 150 of the resource extraction system 10 that includes the access points 78 (referring collectively to access points 78A, access point 78D, and access point 78B) and the AUV 26. The access points 78 may send position data 152 (referring collectively to position data 152A, position data 125B, and position data 152C). It should be noted that the position data 152 itself may not be indicative of a position but rather may be used by the AUV 26 in a manner generally similar to how the data processing system 72 may utilize received data as discussed above with respect to FIG. 6. For example, the communication circuitry 46 of the AUV 26 may receive the position data 152 from the access points 78, and the processing circuitry 40 may process (e.g., by executing the application 54) the received position data 152 to determine amounts of time for transmission of each portion of the position data 152 between an access point 78 and the AUV 26. The processing circuitry 26 (e.g., by executing the application 54) may also determine the distances between the access points 78 and the AUV 26 and determine the location of the AUV 26 using the distances. As such, the AUV 26 may determine its own location. Additionally, as noted above, the AUV 26 may then utilize the location data, for example, to reposition itself or to otherwise aid in performing inspection, maintenance, and repair activities.

It should be noted that while FIG. 6 and FIG. 7 are discussed above with respect to three access points 78, in some embodiments, a different number of access points 78 may be utilized. For example, in certain embodiments, the location of the AUV 26 may be determined using two, four, five, six, or more access points 78.

Technical effects of the disclosure include enabling the location of the AUV 26 to be accurately determined, which may improve the performance of inspection, maintenance, and repair activities that are performed using the AUV 26 or other ROVs in subsea environments. For example, the location of the AUV 26 using the presently disclosed techniques may be determined accurately within a meter of the actual location of the AUV 26. Additionally, the presently described techniques enable data to be transmitted in an underwater (or partially underwater) communication network in a high bandwidth, low latency manner that also results in reduced or a minimal amount of packet loss (e.g., as caused by data collisions). Accordingly, the techniques described herein provide for improved underwater communication.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A resource extraction system, comprising:
   an access point disposed on an underwater production asset;
   a data processing system located above-sea from the underwater production asset, the data processing system comprising processing circuitry communicatively coupled to the underwater production asset via a wired connection, the processing circuitry configured to:
      receive data indicative of communication parameters utilized by a transmitter of an autonomous underwater vehicle (AUV) to transmit data to the access point of the underwater production asset via a wireless communication channel;
      determine a location of the AUV or receive location data indicative of the location of the AUV;
      perform a plurality of simulations based on the communication parameters and the location of the AUV to evaluate:
         a first expected performance within the wireless communication channel corresponding to utilizing the communication parameters; and
         a second expected performance within the wireless communication channel corresponding to utilizing different communication parameters;
      determine, based on the data indicative of the communication parameters, that the transmitter should utilize different communication parameters based on the location of the AUV; and
      in response to determining different communication parameters should be utilized, generate and send an instruction to cause the AUV to utilize the different communication parameters.

2. The resource extraction system of claim 1, wherein the processing circuitry is further configured to determine that the transmitter should utilize the different communication parameters by determining that, relative to the first expected performance, the second expected performance results in higher bandwidth, lower latency, less data packet loss, or a combination thereof.

3. The resource extraction system of claim 1, wherein the communication parameters comprise packet length, data rate, carrier frequency, or a combination thereof.

4. The resource extraction system of claim 1, wherein the data processing system is at least partially included in a floating producing storage and offloading (FPSO) unit.

5. The resource extraction system of claim 4, wherein the data processing system is at least partially implemented by one or more cloud-computing devices.

6. The resource extraction system of claim 1, wherein the access point comprises an acoustic modem.

7. The resource extraction system of claim 1, wherein the underwater production asset comprises a production manifold or a Christmas tree.

8. A computer-implemented method, comprising:
   receiving, via processing circuitry of a data processing system located above-sea from an underwater production asset, data indicative of communication parameters utilized by a transmitter of an autonomous underwater vehicle (AUV) to transmit data to an access point of the underwater production asset via a wireless communication channel, wherein the underwater production asset is communicatively coupled to the processing circuitry via a wired connection, and wherein the processing circuitry is configured to determine a location of the AUV or receive location data indicative of the location of the AUV;
   performing, by the processing circuitry, a plurality of simulations based on the communication parameters and the location of the AUV to evaluate:
      a first expected performance within the wireless communication channel corresponding to utilizing the communication parameters; and
      a second expected performance within the wireless communication channel corresponding to utilizing different communication parameters;
   determining, by the processing circuitry based on the data indicative of the communication parameters, that the transmitter should utilize different communication parameters based on the location of the AUV; and
   in response to determining different communication parameters should be utilized, generating and sending an instruction to cause the AUV to utilize the different communication parameters.

9. The computer-implemented method of claim 8, comprising determining, by the processing circuitry, that the transmitter should utilize the different communication parameters by determining that, relative to the first expected performance, the second expected performance results in higher bandwidth, lower latency, less data packet loss, or a combination thereof.

10. The computer-implemented method of claim 8, wherein:
    the communication parameters comprise packet length, data rate, carrier frequency, or a combination thereof.

11. The computer-implemented method of claim 8, wherein the access point comprises an acoustic modem.

12. The computer-implemented method of claim 8, wherein the underwater production asset comprises a production manifold or a Christmas tree.

13. The computer-implemented method of claim 8, wherein the data processing system is at least partially included in a floating producing storage and offloading (FPSO) unit.

14. The computer-implemented method of claim 13, wherein the data processing system is at least partially implemented by one or more cloud-computing devices.

* * * * *